No. 886,571. PATENTED MAY 5, 1908.
J. YULE.
PIPE NIPPLE HOLDER.
APPLICATION FILED JUNE 7, 1906.
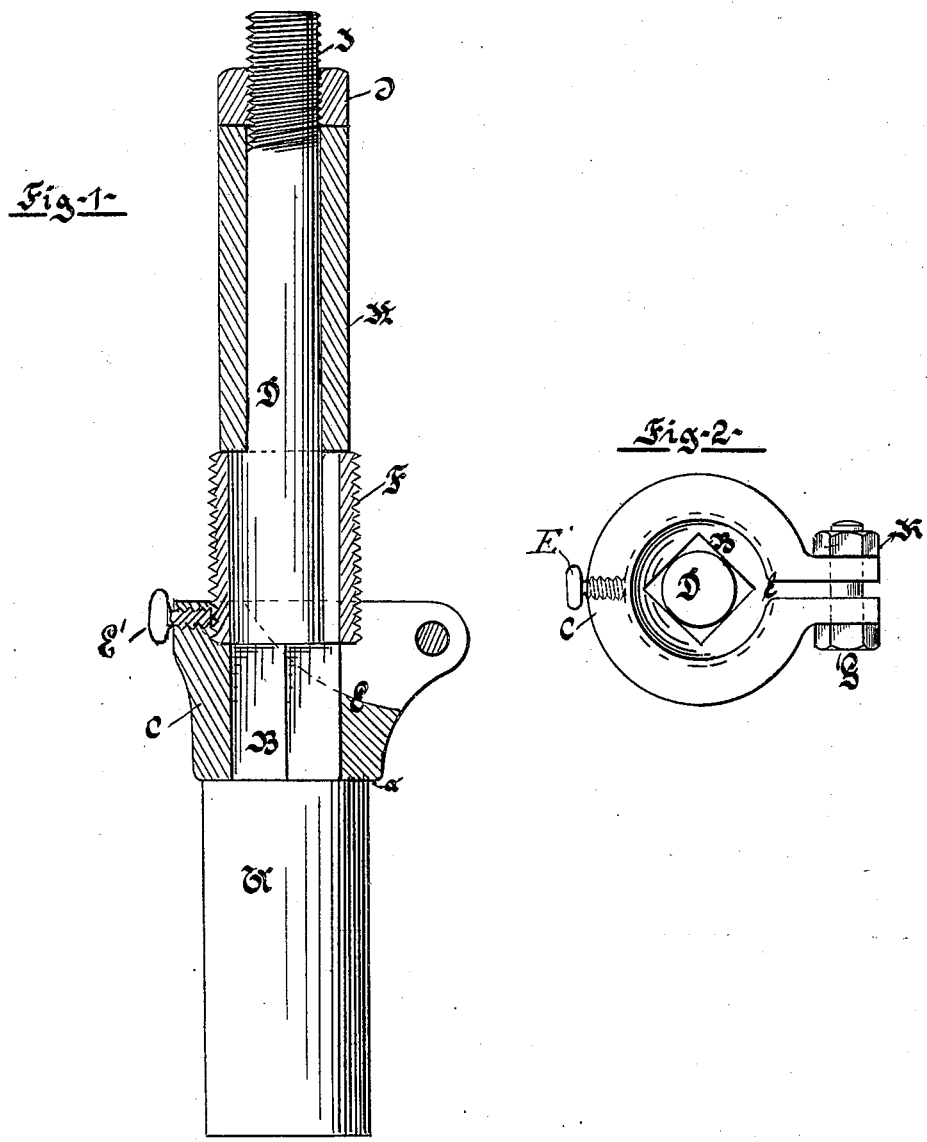

UNITED STATES PATENT OFFICE.

JOHN YULE, OF NEW YORK, N. Y.

PIPE NIPPLE-HOLDER.

No. 886,571.         Specification of Letters Patent.         Patented May 5, 1908.

Application filed June 7, 1906. Serial No. 320,563.

*To all whom it may concern:*

Be it known that I, JOHN YULE, residing in the city of Greater New York, in the county and State of New York, have invented certain new and useful Improvements in Pipe Nipple-Holders, of which the following is a specification.

My invention in pipe nipple holders relates to a means for securing a nipple exteriorly at one of its ends while the same is being tapped at its other extremity.

The novel holder involves a split screw chuck provided with a shank with which the same may be held securely in position in a vise, while the nipple which is in screw engagement with the chuck is being tapped, together with a guide for receiving the die guide for enabling the operator to start his thread perpendicular to the axis of the nipple.

The object of the invention is to provide a simple, and inexpensive tool combined with durability for use more particularly on construction work in pipe fitting, although the tool may be employed for the threading of nipples in shop use.

In the drawings hereto attached which form part of this specification, the different features of novelty will appear, and together with the description thereof comprising the specification, would enable a skilled mechanic to construct and use the same.

With reference to the drawings, Figure 1 is a vertical, longitudinal, sectional view of my improved pipe nipple holder as applied to a nipple, a guide sleeve and securing nut, and illustrating the shank in side elevation; and Fig. 2 is a top plan view of the nipple holder and shank, the nut being omitted.

In both views similar characters of reference designate like parts, wherein,

The shank A provided with a square neck B and a concentrically, vertically threaded extending portion or stem D constitutes the standard; while the split screw chuck C, having a central corresponding square opening to fit the neck B, to restrict the same against rotation when the shank A is secured in a vise or other suitable clamp, constitutes the principal part of the device.

In making use of the tool for threading a nipple, let it be assumed that the terminal of a piece of pipe is threaded with a nipple threading die such as is ordinarily employed by pipe fitters so as to provide a tapering thread. The thread may thus be cut upon the nipple midway of the desired length of the same, presenting a somewhat tapering thread variation, the initial threads being deep or full while each succeeding thread will be cut to a somewhat less extent, thereby giving to the end of the pipe from which the nipple is to be cut, a gradual taper. In order to cut the thread on the nipple for its entire length, it obviously will be necessary to sever the portion of the pipe required for the nipple from the remainder of the pipe, in order that a tapering thread may be cut on the opposite extremity of the required nipple. The threaded piece being cut from the pipe to obtain the nipple is secured by its threaded portion to the chuck C by screwing the same into position therein. The sleeve H is then passed over the stem D, and the nut I is applied to the threaded portion J. The nipple cutting die is then passed over the nut I and the guide sleeve H with the die guide uppermost, and the thread then is cut upon the upper end of the nipple to meet the thread which was originally cut on the same prior to severing it from the length of pipe. The nipple will then present the appearance as illustrated at F, Fig. 1.

It is obvious that without the provision of the guide sleeve H the cutting die would have to be applied with its guide presented in a direction towards the shank A, and in consequence thereof, the die could not be brought into action with the end of the nipple F in order to cut the thread thereon, for the reason that in practice these guides are of a length greater than that of the nipple illustrated in Fig. 1 in proportion to its diameter, and in attempting to cut the thread upon the nipple by reversing the die, the absence of the guide afforded by the sleeve H would preclude the possibility of starting the die "straight."

In order to release the nipple F after the same has been threaded, this operation having the tendency to jam the tapering thread thereof in the screw chuck, the clamp nut K of the bolt G (see Fig. 2) which secures the split lugs E of the chuck, is backed off, whence the chuck C is permitted to expand, whereupon its grip upon the nipple F will have become relaxed, and upon removing the sleeve H by backing the nut I off of the threaded portion of the stem J, the nipple F may be removed from the chuck C.

In order to prevent the nipple blank F from rotating during the threading operation, the clamping effect of the clamp E not being sufficient to hold the nipple F against rotation, the set screw E' is set up firmly against the already threaded portion of the blank engaged in the chuck C; it will therefore be found necessary to back the set screw E off when it is desired to remove the finished nipple F.

Having fully described my invention, I claim as new and desire to secure by Letters Patent of the United States:—

1. In a tool of the character described, a pipe nipple holder comprising a shank, a squared portion on the shank concentric therewith and of a larger diameter than the shank, a longitudinally extending coaxial larger portion integral with the said squared portion, and a shoulder between the squared portion and the larger portion, said squared portion carrying a chuck, said chuck being provided with a squared aperture to fit said squared portion, the said chuck having a threaded recess of larger diameter than the squared perforation and adjacent thereto, a set screw radially extending through the wall of the chuck and emerging at the said threaded recess and a contracting clamp for the chuck.

2. In a tool of the character described, comprising a longitudinal shank, having an integrally formed squared portion of smaller diameter than the shank and an integrally formed cylindrical portion of smaller diameter than the said squared portion, the whole being coaxial and a screw thread at the free terminal of the smaller and cylindrical portion, the combination with the squared portion of a chuck provided with a squared perforation to fit the squared portion, and a cylindrical coaxial threaded portion, the chuck being provided with a set screw passing radially through the wall thereof and emerging at the threaded recess and a clamp for the chuck and of a clamping sleeve adapted to be carried by the smaller portion, and a clamping nut screw threaded to the thread of the smaller portion, adapted to impinge against one terminal of the said sleeve.

In testimony whereof, I have signed my name to this specification, in the presence of two subscribing witnesses.

JOHN YULE.

Witnesses:
PHILIP K. STERN,
O. E. PEHRSSON.